(12) United States Patent
Durvasula et al.

(10) Patent No.: US 11,468,439 B2
(45) Date of Patent: Oct. 11, 2022

(54) SYSTEMS AND METHODS FOR BLOCKCHAIN BASED PROOF OF PAYMENT

(71) Applicant: American Express Travel Related Services Company, Inc., New York, NY (US)

(72) Inventors: Sastry Durvasula, Phoenix, AZ (US); Andras Ferenczi, Phoenix, AZ (US); Sathish Muthukrishnan, Phoenix, AZ (US); Vishnuvajhala V. Subrahmanyam, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 999 days.

(21) Appl. No.: 15/405,123

(22) Filed: Jan. 12, 2017

(65) Prior Publication Data
US 2018/0197173 A1  Jul. 12, 2018

(51) Int. Cl.
*G06Q 20/38* (2012.01)
*G06Q 20/34* (2012.01)
*G06Q 20/20* (2012.01)
*G06Q 20/04* (2012.01)

(52) U.S. Cl.
CPC ....... *G06Q 20/3829* (2013.01); *G06Q 20/047* (2020.05); *G06Q 20/209* (2013.01); *G06Q 20/34* (2013.01); *G06Q 20/3823* (2013.01); *G06Q 2220/00* (2013.01)

(58) Field of Classification Search
None
See application file for complete search history.

(56) References Cited

U.S. PATENT DOCUMENTS

| 9,123,064 | B2* | 9/2015 | Hogg | G06Q 20/12 |
| 10,290,003 | B1* | 5/2019 | Hammad | G06Q 20/401 |
| 10,977,646 | B2* | 4/2021 | O'Connell | G07C 9/27 |

(Continued)

FOREIGN PATENT DOCUMENTS

| AU | 2016208989 A1 * | 8/2017 | G06Q 20/3267 |
| EP | 3872666 A1 * | 1/2016 | |
| WO | WO-2018007828 A2 * | 1/2018 | G06Q 40/02 |

OTHER PUBLICATIONS

Blockchain Platform for Industrial Internet of Things. https://www.scirp.org/pdf/JSEA_2016102814012798.pdf (Year: 2016).*

(Continued)

*Primary Examiner* — El Mehdi Oussir
(74) *Attorney, Agent, or Firm* — Thomas | Horstemeyer, LLP

(57) ABSTRACT

A proof-of-payment system may receive a payment confirmation including a transaction amount and a merchant identifier. The system may select a record from a registration repository by matching the merchant identifier to the record. The record may have a public key associated with the merchant identifier via a registration process, for example. The system may also generate a proof-of-payment payload comprising an identifier and a payment amount, and encrypt the proof-of-payment payload using the public key. The system may write the encrypted proof-of-payment payload to a blockchain maintained on a first blockchain node.

20 Claims, 7 Drawing Sheets

(56) References Cited

U.S. PATENT DOCUMENTS

| | | | | |
|---|---|---|---|---|
| 11,068,978 | B1* | 7/2021 | Ferreira | H04L 9/0637 |
| 2004/0019571 | A1* | 1/2004 | Hurwitz | G06Q 20/387 |
| | | | | 705/65 |
| 2006/0212407 | A1* | 9/2006 | Lyon | G06Q 20/4016 |
| | | | | 705/71 |
| 2009/0132813 | A1* | 5/2009 | Schibuk | G06Q 20/322 |
| | | | | 713/158 |
| 2009/0193500 | A1* | 7/2009 | Griffin | H04B 5/00 |
| | | | | 726/2 |
| 2011/0311052 | A1* | 12/2011 | Myers | H04L 63/10 |
| | | | | 380/270 |
| 2012/0280790 | A1* | 11/2012 | Gerhardt | G07C 9/00571 |
| | | | | 340/5.61 |
| 2013/0117087 | A1 | 5/2013 | Coppinger | |
| 2014/0074696 | A1* | 3/2014 | Glaser | G06Q 20/341 |
| | | | | 705/39 |
| 2014/0077929 | A1* | 3/2014 | Dumas | G07C 9/00174 |
| | | | | 340/5.61 |
| 2015/0041534 | A1* | 2/2015 | Rayner | G06Q 20/327 |
| | | | | 235/380 |
| 2015/0221149 | A1* | 8/2015 | Main | G06Q 20/322 |
| | | | | 340/5.61 |
| 2016/0210626 | A1* | 7/2016 | Ortiz | G06Q 20/023 |
| 2016/0292680 | A1* | 10/2016 | Wilson, Jr. | G06Q 20/3674 |
| 2016/0342978 | A1* | 11/2016 | Davis | G06Q 20/02 |
| 2016/0342989 | A1 | 11/2016 | Davis | |
| 2016/0345978 | A1 | 12/2016 | Cruise | |
| 2017/0048209 | A1* | 2/2017 | Lohe | H04L 63/0442 |
| 2017/0048235 | A1* | 2/2017 | Lohe | G06Q 20/065 |
| 2017/0091740 | A1 | 3/2017 | Enomoto et al. | |
| 2017/0109735 | A1 | 4/2017 | Sheng et al. | |
| 2017/0221050 | A1* | 8/2017 | Jivraj | G06Q 20/341 |
| 2017/0230189 | A1 | 8/2017 | Toll et al. | |
| 2017/0232300 | A1* | 8/2017 | Tran | A63B 71/06 |
| | | | | 434/247 |
| 2017/0372300 | A1 | 12/2017 | Dunlevy et al. | |
| 2018/0006826 | A1 | 1/2018 | Smith | |
| 2018/0075453 | A1 | 3/2018 | Durvasula | |
| 2018/0123804 | A1* | 5/2018 | Smith | H04L 63/0869 |
| 2019/0147709 | A1* | 5/2019 | Schoner | G07G 1/0063 |
| | | | | 235/383 |
| 2020/0067907 | A1* | 2/2020 | Avetisov | H04L 9/0825 |
| 2020/0382480 | A1* | 12/2020 | Isaacson | G06Q 30/0641 |

OTHER PUBLICATIONS

IoT and Blockchain for Smart Locks. https://ieeexplore.ieee.org/stamp/stamp.jsp?tp=&arnumber=8936140 (Year: 2019).*
Super secure door lock system for critical zones. https://ieeexplore.ieee.org/stamp/stamp.jsp?tp=&arnumber=8076773 (Year: 2017).*
Blockchains and Smart Contracts for the Internet of Things, https://ieeexplore.ieee.org/stamp/stamp.jsp?arnumber=7467408 (Year: 2016).*
Simon et al. Proximity door locking. http://www2.imm.dtu.dk/pubdb/edoc/imm7044.pdf (Year: 2016).*
Grant Ho et al. Smart Locks: Lessons for securing commodity internet of things devices. https://people.csail.mit.edu/dtl/pdf/ho-smartlocks.pdf (Year: 2016).*
Mengmei Ye et al. Security Analysis of Internet-of-Things: A Case Study of August Smart Lock. https://seit.egr.msu.edu/paper/MobiSec17_AugustLock.pdf (Year: 2016).*
Internatinal Search Report and Written Opinion PCT Serial No. PCT/US2019/022791 dated Jun. 6, 2019.
Andras L Ferenczi, et al., U.S. Appl. No. 16/012,598, filed Jun. 19, 2018, tilted "Buyer-Centric Marketplace Using Biockchain".
Alaric M Eby, et al. U.S. Appl. No. 16/051,126, filed Jul. 31, 2018, and titled "System and Method for Transaction Account Based Micropayments".
Jane E Cook et al U.S. Appl. No. 16/052,416, filed Aug. 1, 2018 and titled "Procurement System using Blockchain".
Internatinal Search Report and Written Opinion PCT Serial No. PCT/US2018/059670 dated Jan. 25, 2019.
Non-Final Office Action dated May 13, 2019 in U.S. Appl. No. 15/266,350.
Sastry Durvasula, et al., U.S. Appl. No. 15/266,350, filed Sep. 15, 2016, titled "Systems and Methods for Blockchain Based Payment Networks," 44 pages.
Balaji Balaraman, et al., U.S. Appl. No. 15/824,513, filed Nov. 28, 2017, titled "Transaction Authorization Process Using Blockchain," 48 pages.
Andras L Ferenczi, et al., U.S. Appl. No. 16/012,598, filed Jun. 19, 2018, tilted "Buyer-Centric Marketplace Using Blockchain".
Final Office Action dated Sep. 11, 2019 in U.S. Appl. No. 15/266,350.
Balaji Balaraman, et al., U.S. Appl. No. 15/943,168, filed Apr. 2, 2018, titled "Transaction Process using Blockchain Token Smart Contracts".

* cited by examiner

250 ⇀

Merchant Registration Form

Merchant Name: [Bob's Rental Properties Inc.] ⟵ 252

Public Key: [232abc965-c6c1--4fc1-ba19-017841c4ab57] ⟵ 254

Payment Network Merchant Identifiers:

AMEX: [111111111] ⟵ 256

VISA: [222222222] ⟵ 258

MasterCard: [333333333] ⟵ 260

Device Registration

List of all device blockchain addresses:

[20dd8b7a-c6c1-4fc1-ba19-017841c4ab57] ⟵ 262

[ab496593-1773-4dbb-b031-ff599429ee90] ⟵ 264

[01497627-c7d7-4a15-8ba7-625c162bcad1] ⟵ 266

[40e4fac1-9efe-4681-ae41-dd5aaa0fca2e] ⟵ 268

[ Submit ]

FIG. 2B

SYSTEMS AND METHODS FOR BLOCKCHAIN BASED PROOF OF PAYMENT

FIELD

This disclosure relates to proof of payment using a distributed database.

BACKGROUND

Payment networks typically utilize various systems for processing transactions between merchants and customers. Customers have a transaction account with the payment network. Merchants are members of the payment network and the merchants are authorized to charge to customer accounts. To complete a transaction, a merchant typically transmits a payment request to the payment network with transaction details and the card member's account information.

Payment for goods and services typically occurs at a point of sale or over the Internet. In some instances, such as airline travel and concerts, for example, tickets may issue after confirmation of the payment. In the case of a home rental over the internet, the service provider may email a receipt or confirmation of payment to the housing provider. However, beyond a receipt or a ticket, there are limited options to prove payment. Continuing the above housing example, the housing provider would typically give a key to the renter either in person, through the mail, or by hiding the key on the premises. A period of several days may pass between the renter submitting payment, to the housing provider receiving confirmation, and finally the renter receiving the key.

SUMMARY

A system, method, and computer readable medium (collectively, the "system") is disclosed for verifying an earlier payment using a blockchain-based system. The system may receive a payment confirmation including a transaction amount and a merchant identifier. A record may be selected from a registration repository by matching the merchant identifier to the record. The record may have a public key associated with the merchant identifier via a registration process, for example. The system may generate a payment payload comprising an identifier and a payment amount, and encrypt the payment payload using the public key. The system may also write the encrypted payment payload to a blockchain maintained on a first blockchain node.

In various embodiments, the system may propagate the encrypted payment payload to a second blockchain node that maintains a copy of the blockchain. A smart connected device may fetch the encrypted payment payload from the second blockchain node. The smart connected device may further decrypt the encrypted payment payload, match the identifier from the payment payload to a second identifier presented at the smart connected device, and trigger an action in response to the identifier from the payment payload matching the second identifier presented at the smart connected device. The smart connected device may also reduce the payment amount of the payment payload in response to the triggering the action. The action may include, for example, actuating at least one of an electromechanical actuator or a solenoid, illuminating a light, or changing the state on a graphical display. The system may register the smart connected device to a merchant, for example, using a registration portal.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

FIG. 2B illustrates an exemplary form for use in registering smart devices with a proof of payment system, in accordance with various embodiments;

DETAILED DESCRIPTION

The detailed description of various embodiments refers to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems and methods of the present disclosure enable smart connected devices to initiate actions to service paying customers. A payment processing entity (e.g., a credit card network, bank, debit, bitcoin, rewards points, or ACH) provides evidence of a payment in a tamper-proof manner by writing the proof of payment to a blockchain. A smart device connected to the blockchain may detect the proof of payment, and can extract relevant information. The information may be encrypted on the blockchain such that access is restricted to entities having the correct cryptographic keys. The information may be verified in presence of a customer as desired.

For example, the system may be used to unlock a hotel, rental, or shared economy property door using the card (e.g., that was used for the payment) to look up proof of payment on a blockchain. Similarly, a paying customer may gain access using a smartphone app that communicates using Bluetooth with the smart device by transmitting an identifier, which may be used to look up proof of payment on a blockchain.

In another example, the system may be used to provide ticketless access to venues (e.g., movie theater, sports event, concert, etc.) to a customer, in response to swiping the card (e.g., that was used for event payment), or launching a smartphone application with an identification, which may be used to look up proof of payment on a blockchain. In still another example, the system may enable access control to rental vehicles (e.g., bike, boat, or car) to a customer in response to swiping the card (e.g., that was used for the payment), or launching a smartphone application with an identification, which may be used to look up proof of payment on a blockchain.

Figure 1:
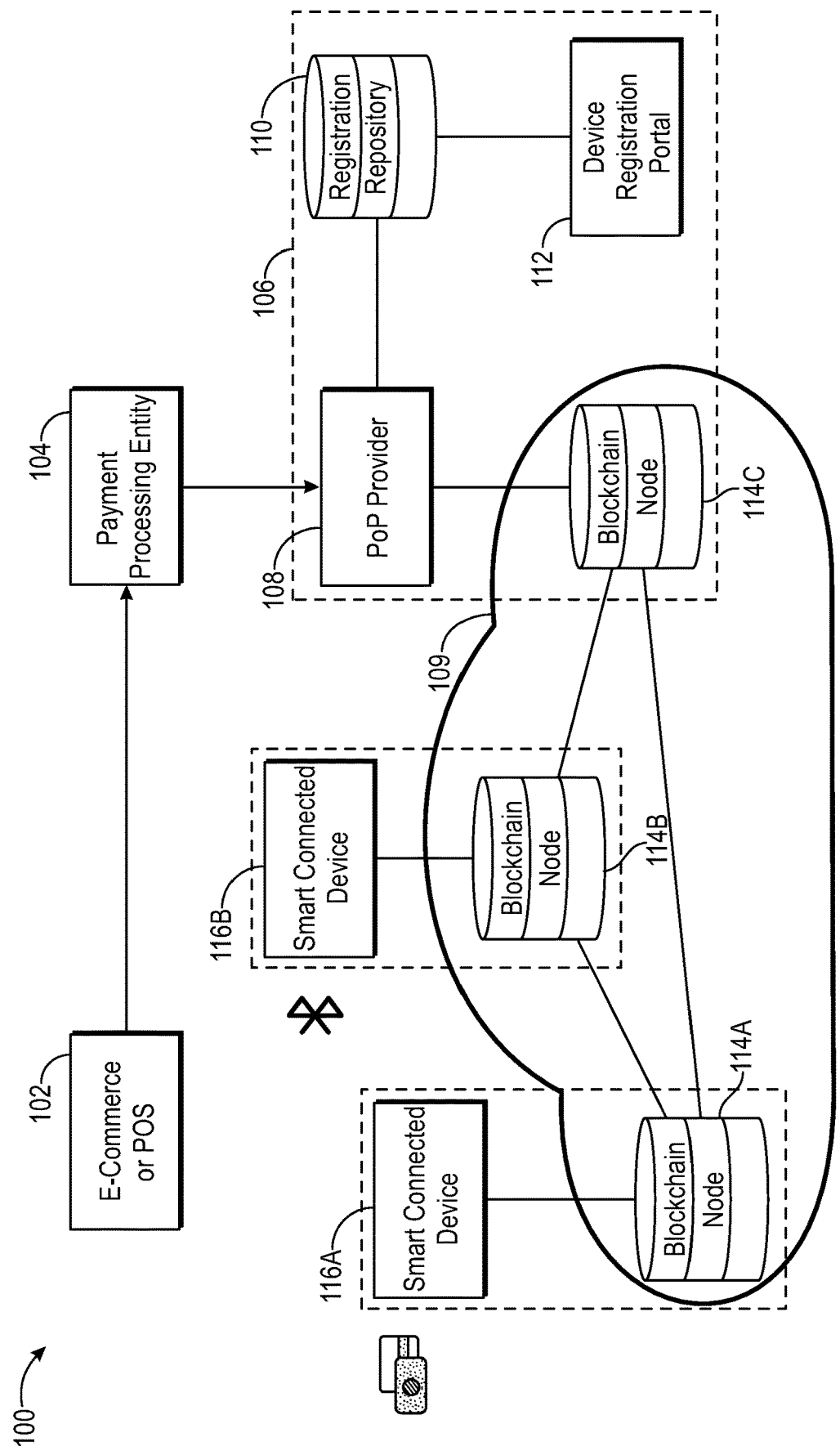
FIG. 1 illustrates a proof of payment system using a blockchain to propagate proof of payment to various devices, in accordance with various embodiments.

With reference to FIG. 1, a proof-of-payment (PoP) system 100 is shown, according to various embodiments. PoP system 100 may be implemented using smart contracts maintained on blockchain 109. A blockchain is a distributed database that maintains records in a readable manner and is also resistant to tampering. In the context of PoP system 100, a blockchain may serve as a digital record containing proof of payment for payments successfully completed (or for any portion of the process).

The blockchain may comprise a system of interconnected blocks containing data. The blocks can hold transaction data, contract data, proof-of-payment data, identification data, and/or other information as desired. Each block may link to the previous block and may include a timestamp. When implemented in support of a payment network, the blockchain may serve as a record for proof-of-payment payloads, balances associated with the proof-of-payment payloads, and/or other suitable data retained in the blockchain. The blockchain may be a peer-to-peer network that is private, consortium and/or public in nature (e.g., Ethereum, Bitcoin, etc.). Consortium and private networks may offer improved control over the content of the blockchain. Public networks may leverage the cumulative computing power of the network to improve security.

PoP system 100 may include various computing devices configured to communicate via a network. For example, a merchant device 102, payment processing entity 104, PoP provider 108, registration portal 112, smart connected device 116A, smart connected device 116B (collectively referred to as "the smart connected devices 116"), and/or PoP network 106 may each include computing devices configured to perform processes described herein and communicate over a network. The computing devices may include any device capable of transmitting, receiving, and/or displaying an electronic message via a network and communicating with a blockchain 109.

For example, the computing devices may take the form of a computer or processor, or a set of computers/processors, although other types of computing units or systems may be used. Exemplary computing devices include servers, pooled servers, laptops, notebooks, hand held computers, personal digital assistants, cellular phones, smart phones (e.g., iPhone®, Android®, etc.) tablets, smart wearables, Internet of things (IOT) devices or any other device capable of receiving data over network. Each computing device may run applications to interact with blockchain 109, communicate with other devices, perform crypto operations, and otherwise operate within PoP system 100.

As used herein, the term "network" includes any cloud, cloud computing system or electronic communications system or method that incorporates hardware and/or software components. Communication among the parties may be accomplished through any suitable communication channels, such as, for example, a telephone network, an extranet, an intranet, Internet, point of interaction device (point of sale device, personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may be unsecure. Thus, communication over the network, and data written to blockchain 109, may utilize data encryption. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems. Asymmetric encryption in particular may be of use in signing and verifying signatures for blockchain crypto operations.

Merchant device 102 may include one or more of an e-commerce server, a point-of-sale (POS) device, a tablet, a computer, or any other computing device described herein. Merchant device 102 may be in communication over a network with servers of payment processing entity 104. Merchant device 102 may request authorization for a payment transaction by transmitting to the servers of payment processing entity 104 transaction details such as account number, amount, merchant identifier, customer identifier, date, time, currency identifier, country identifier, or other suitable data as documented in the ISO 8583 standard for financial transaction card originated messages, for example. Payment processing entity 104 may process the payment and forward to PoP network 106 the transaction details as well as confirmation that the requested payment was successful.

The transaction details and confirmation may be received by PoP provider 108. The PoP provider may retrieve merchant details associated with the transaction from the registration repository 110. Registration repository 110 may include records including merchant identifiers, merchant public keys, payment network merchant identifiers, and device registrations for smart connected devices 116 registered to the merchant. Smart connected devices 116 may include devices such as smart locks, smart lights, or other smart devices configured to perform an action in response to a PoP payload on blockchain 109. Registration repository 110 may be configured in any data storage format. For example, registration repository 110 may be a relational database, a big data store, a distributed file system, a noDB or noSQL database, a document-based database, or any other suitable data storage system.

Using the merchant's public key (e.g., of an asymmetric cryptographic key pair), PoP provider may perform crypto operations to encrypt a proof-of-payment payload and write the encrypted payload to the blockchain. Although encryption may be used to enhance security and restrict access to PoP payloads, the system may also be configured to operate in clear text without performing cryptographic operations on the PoP payloads. A device registration portal accessible by merchants may add smart connected devices 116 to the registration repository.

In various embodiments, devices of PoP system 100 (e.g., smart connected devices 116 and servers of PoP provider 108) may interface with blockchain 109 using a client library or process implemented using technologies such as, for example, Ethereum GETH, eth-lightwallet, or other suitable blockchain interface technologies. The devices may run a client application that can be a thin client (web) based, hybrid (i.e. web and native, such as iOS and Android), or native application. Smart connected devices 116 and PoP provider may also be configured to communicate with blockchain 109 and may maintain a blockchain node 114. Each blockchain node 114 may maintain a full or partial copy of blockchain 109. Servers of PoP provider 108 and/or smart connected devices 116 may thus be programmed to read blockchain 109, identify a PoP payload, ready the PoP payload, and adjust the balance of the PoP payload and/or mark the PoP payload as redeemed, as described in detail below.

In various embodiments, blockchain 109 may thus host the PoP system 100 supporting execution and/or recording of various actions (e.g., account registration, proof of payment, balances on proof of payment, or other related actions). Blockchain 109 may be based on blockchain technologies (e.g., Ethereum, Open Chain, Chain Open Standard, etc.). Blockchain 109 may include a program written in a programming language such as, for example, Solidity, or any other suitable programming language for performing operations on blockchain nodes 114.

Figure 2A:
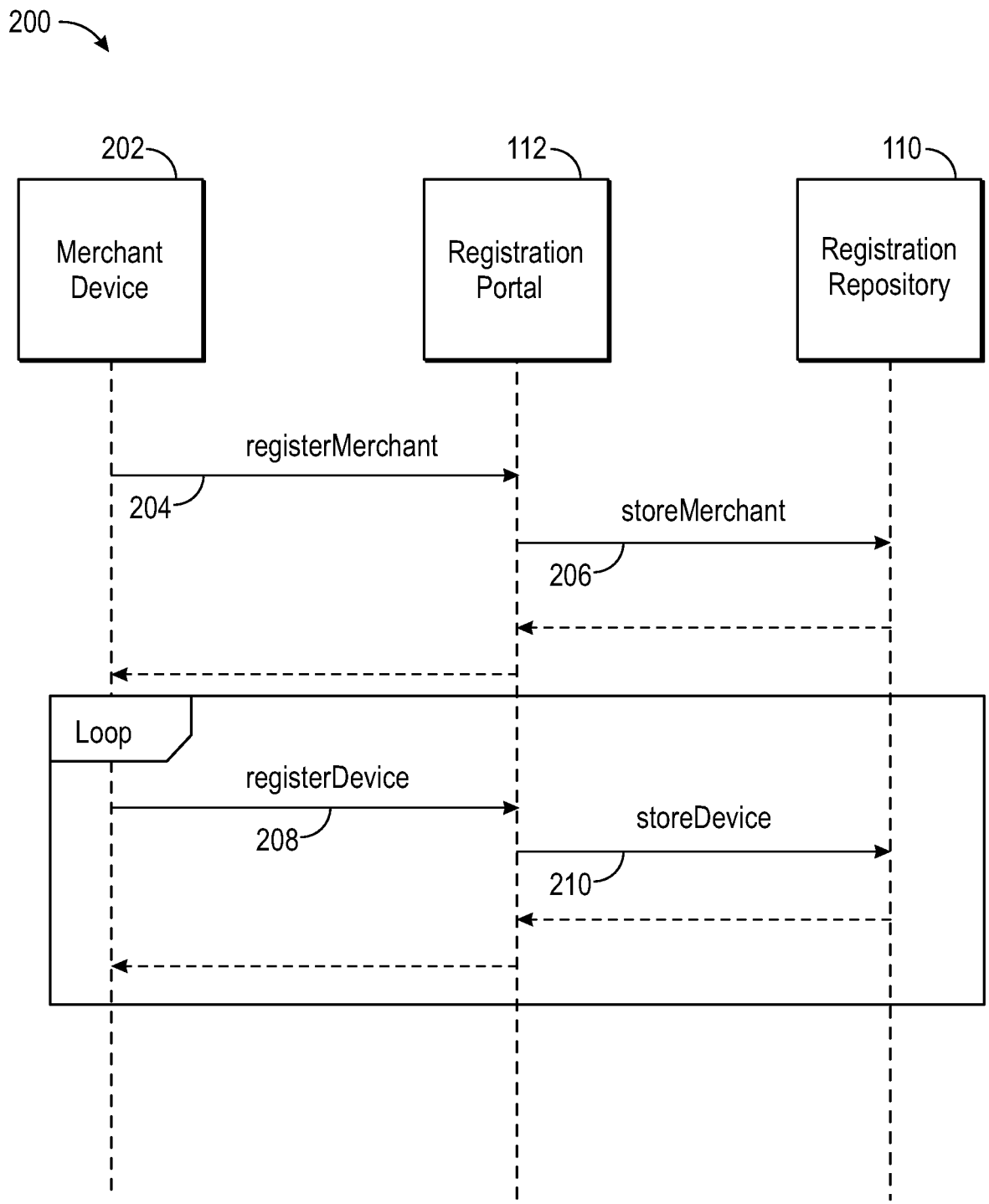
FIG. 2A illustrates an exemplary process for registering smart devices with a proof of payment system, in accordance with various embodiments.

Referring to FIGS. 2A and 2B, an exemplary registration process 200 using registration interface 250 is shown, in accordance with various embodiments. A merchant device 202 may interact with registration portal 112 running on PoP network 106 to enter and/or read information. Registration process 200 may be completed using merchant device 202 to communicate over a WAN such as the internet, a smaller LAN, or one of the suitable network types described above. The steps of registration process 200 may be executed using PoP system 100 of FIG. 1 in a possible order of operation with the top arrows indicating earlier execution than the bottom arrows.

Registration process 200 may begin with merchant device 202 opening the registration interface 250 (Step 204). Registration interface 250 may be used to communicate with registration portal 112 to register a merchant with PoP provider 108. Registration interface 250 may take the form of a client application such as a thin-client (web) based, hybrid (i.e. web and native, such as iOS and Android), or native application. The registration portal 112 may store the merchant details in registration repository 110 (Step 206). Registration interface 250 may include fields for merchant device 202 and/or a related merchant account. The fields may include, for example, merchant name 252, public key 254, merchant identifiers for various payment networks associated with a bank, financial institution, debit network (e.g., AMEX id, 256, VISA id 258, MasterCard id 260, etc.).

Various smart connected devices 116 may also be registered with the merchant account. Merchant device 202 may commit merchant device addresses using registration interface 250 to communicate with registration portal 112. The registration process may be repeatable to add and/or remove smart connected devices 116 associated with the merchant account. Blockchain addresses for various devices registered to the merchant account (e.g., first device address 262, second device address 264, third device address 266, fourth device address 268, etc.) may be displayed, entered, and/or detected at registration portal 112. A merchant may enter the appropriate registration information into registration interface 250, or information may be auto populated in registration interface 250, for submission to registration portal 112. Device registration may enable individual smart connected devices 116 to identify the PoP payloads on the blockchain associated with the merchant.

Figure 3A:
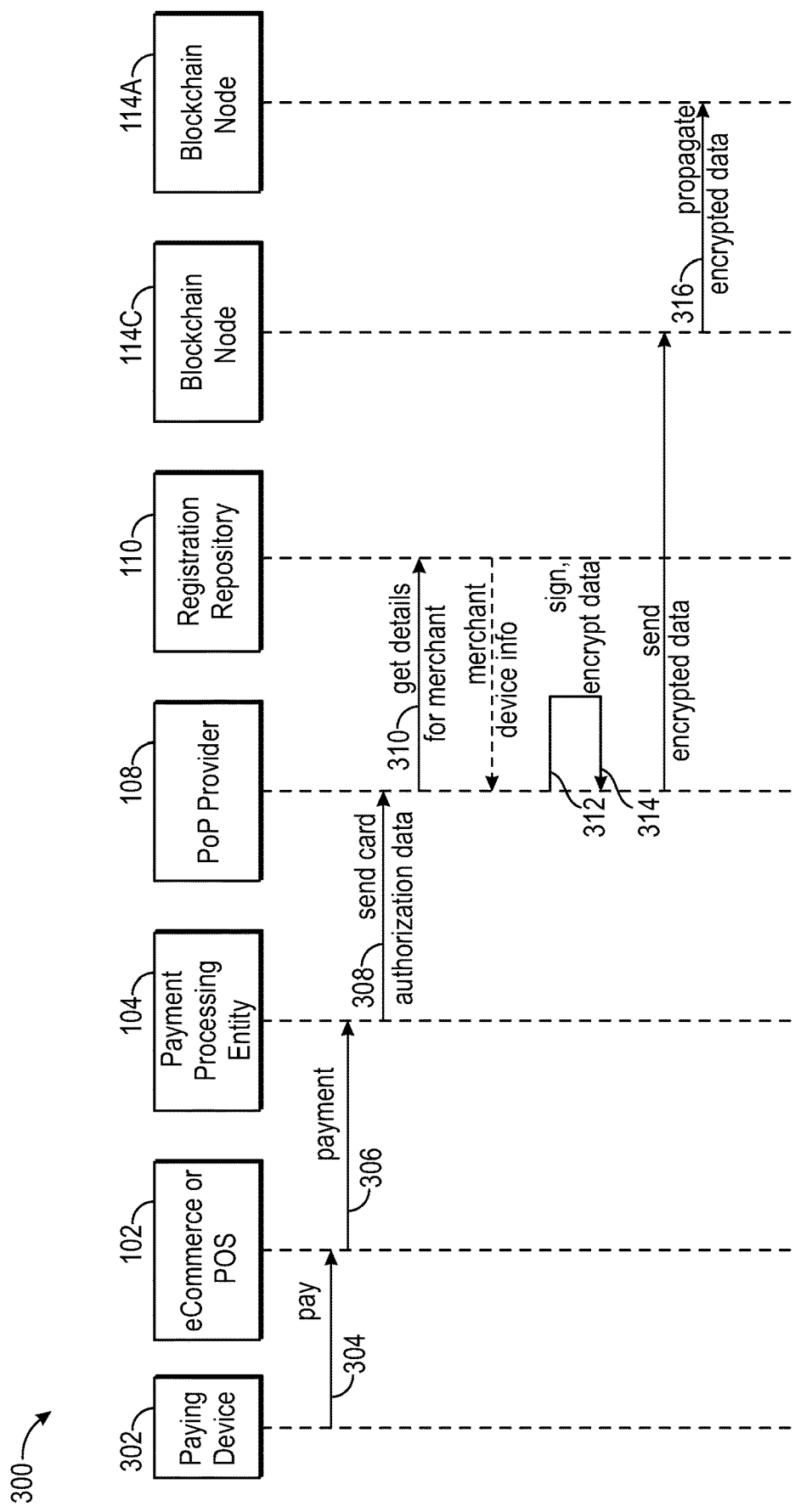
FIG. 3A illustrates an exemplary process for writing a proof of payment to a blockchain and propagating the proof of payment to various blockchain nodes, in accordance with various embodiments.
Figure 3B:
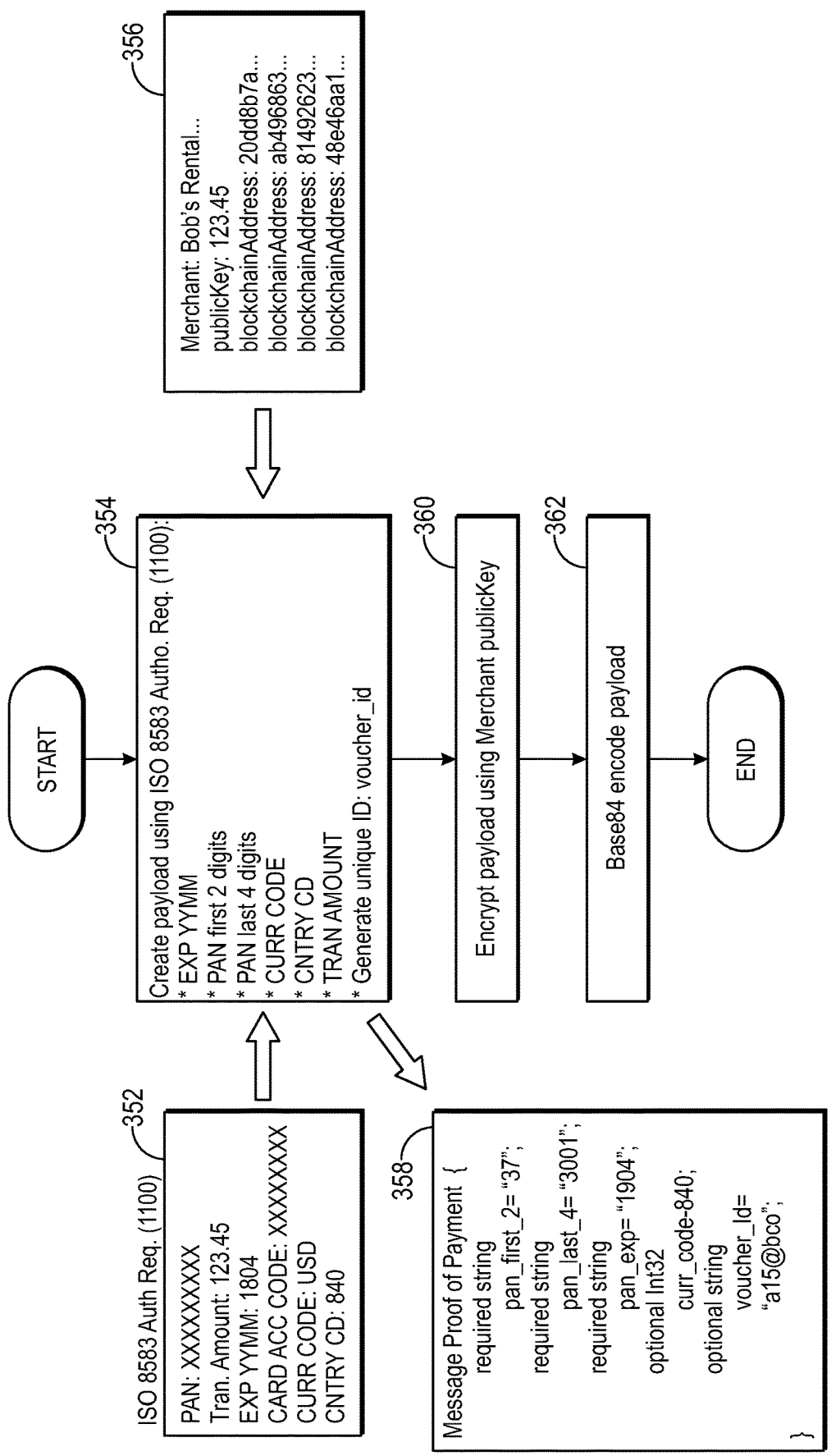
FIG. 3B illustrates a flow chart for generating a proof of payment for writing to a blockchain, in accordance with various embodiments.

Referring now to FIGS. 3A and 3B, an exemplary process 300 for writing a PoP payload to blockchain 109 using PoP system 100 is shown, in accordance with various embodiments. Process 300 may function with the exemplary flow chart 350 depicting data flow between components of PoP system 100.

A customer may visit a brick-and-mortar store, visit an e-commerce website, launch native application, or otherwise initiate a payment transaction using a payment device 302 to interact with merchant device 102 (Step 304). Payment device 302 may include an account code, a computing device, a smart phone, a smart wearable (e.g., a smart watch or smart ring), token, a fob, a transaction card, or any other device suitable for completing a payment transaction. Merchant device 102 may transmit payment details, such as amount of payment, PAN, card expiration month and year, or other transaction details as described herein to servers of payment processing entity 104 (Step 306). Exemplary payment details are illustrated in authorization request 352 of FIG. 3B. The payment details of authorization request 352 may be available in typical account-based transactions, but other authorizations systems may provide varying data.

In various embodiments, servers of payment processing entity 104 may forward selected transaction details and/or authorization data to the PoP provider 108 (Step 308). PoP provider 108 may, in response to receiving the authorization data, extract network specific merchant id (e.g., AMEX id 256 in FIG. 2B) from the authorization request and use the merchant id to select merchant information from registration repository 110 (Step 310). Registration repository 110 may return merchant and/or device info corresponding to the network merchant id. An example data set 356 returned from registration repository 110 is illustrated in FIG. 3B.

In various embodiments, servers of PoP provider 108 may prepare a PoP payload for writing to blockchain 109 by assembling the data for the PoP payload and/or applying a cryptographic function (Step 312). An exemplary PoP payload 354 is illustrated in FIG. 3B in clear text. PoP payload 354 may use protocol buffers prior to being encrypted and/or Base64 encoded for writing to blockchain 109. The structure may contain non-sensitive data suitable for storage on a publicly viewable Blockchain to discourage brute force attacks. A PoP payload 354 may include an expiry date, a PAN, a portion of a PAN, a tokenized PAN, a token, a currency code, a country code, a transaction amount, a voucher identifier, or other data extracted from the authorization request 352, retrieved from the registration repository 110, or generated by PoP provider 108. For example, the voucher identifier may be a unique identifier generated by PoP provider 108 in response to receiving an authorization request and retrieving the associated merchant data from registration repository 110. The PoP payload may be signed and/or encrypted using the merchant public key and/or a private key of PoP provider 108 (Block 360 of FIG. 3B). The PoP payload may also be encoded in Base64 (Block 362 of FIG. 3*b*).

In various embodiments, PoP provider 108 may write PoP payload to its blockchain node 114C running a blockchain client process (Step 314). Exemplary blockchain client processes may include GETH provided by Ethereum for example.

The internal state variables for a sample Smart Contract supported Blockchain functionality may include a mapping of merchant public addresses used as keys, and a list of associated PoP structures, that may be added as PoP provider 108 receives transaction authorization information. Merchant public keys may also be mapped to a list of registered smart connected devices 116 associated with the merchant. The map may be used to validate a device in response to a device attempting to change the available balance of a PoP payload and/or mark the PoP payload as redeemed. Devices attached to the particular merchant may be permitted to invoke any Smart Contract functions that modify PoP payloads owned by the respective merchant. However, other devices that are not registered to the merchant may not be authorized to modify the PoP payloads owned by the merchant. In various embodiments, PoP payload 354 may propagate to other blockchain nodes 114A and 114B in the normal course of operation of blockchain 109 (Step 316).

Figure 4:
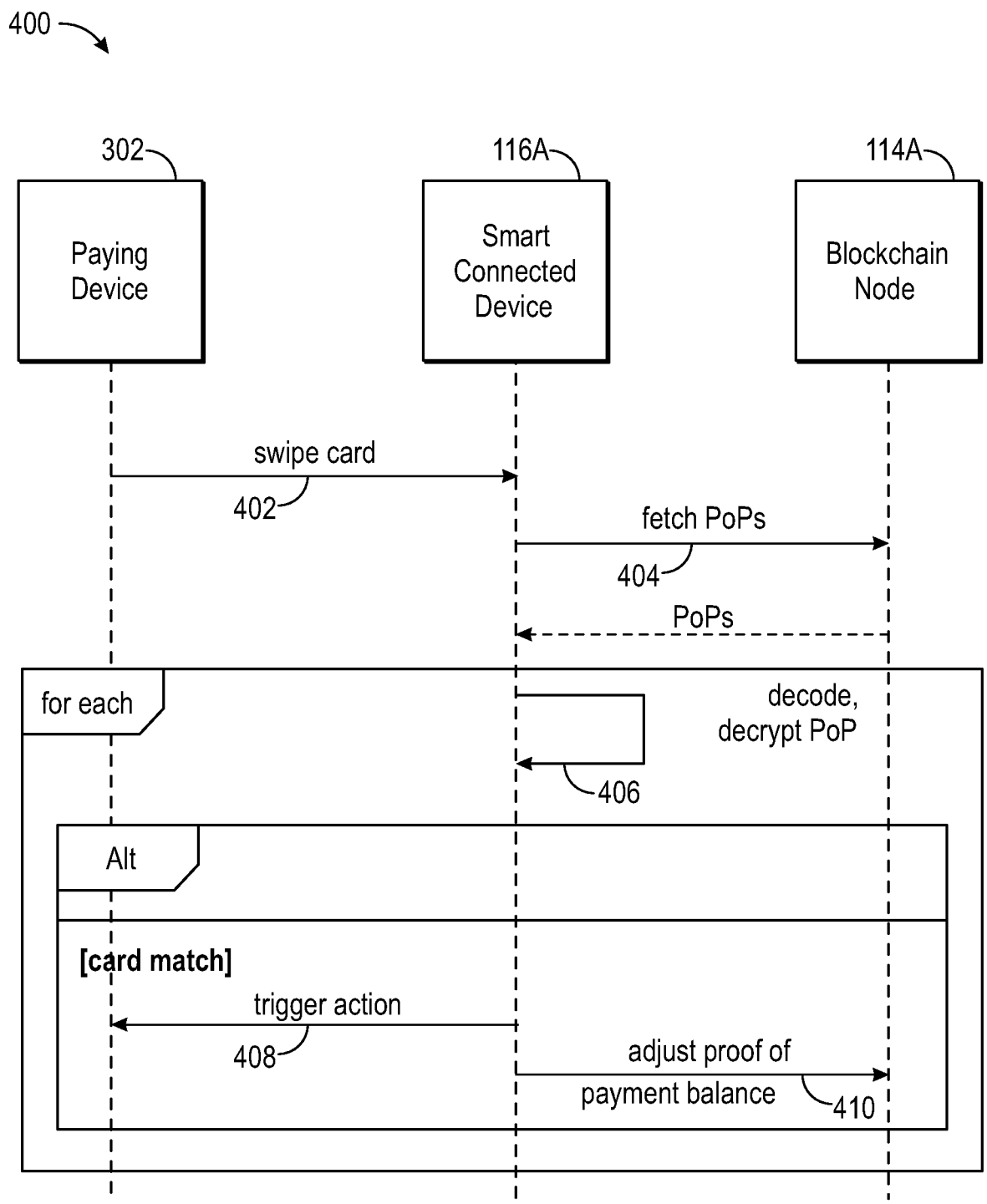
FIG. 4 illustrates an exemplary process for confirming proof of payment and/or adjusting a balance on a blockchain in response to a card swipe, in accordance with various embodiments.

Referring now to FIG. 4, an exemplary process 400 for verifying a PoP payload is shown according to various embodiments. The payment device 302 (e.g., a payment card) associated with the account used to make a payment (e.g., in process 300) may be presented at smart connected device 116A by swiping the card (Step 402). A magnetic stripe reader in electronic communication with smart connected device 116A may read the payment card info, for example, in response to swiping the card.

Smart connected device 116A may invoke a smart contract to fetch all PoP data for the merchant from its blockchain node 114A (Step 404). A smart contract is a protocol or functionality used to verify activity on blockchain 109. Smart connected device 116A may pass the merchant public key (used as a blockchain address) to the smart contract to retrieve associated PoP payloads. As the device belongs to the merchant, the device may have both the merchant's public key and private key available. The smart contract may return the PoP payloads associated with the merchant public key. The smart connected device 116A may also decode and/or decrypt the PoP payloads to access the data retained within the PoP payloads (Step 406).

In various embodiments, smart connected device 116A may iterate through the list of PoP payloads and identify the desired PoP payload by matching credit card info read at the magnetic stripe reader to the credit card info embedded in the PoP payload. In response to a match being found, smart connected device 116A may trigger an action (Step 408). For example, an electromechanical actuator or a solenoid door lock may be triggered to move in response to the identifying the correct PoP payload. Smart connected device 116A may adjust the PoP payload balance and/or mark the PoP payload as redeemed by writing a new entry to the blockchain using a process similar to process 300 (Step 410).

Figure 5:
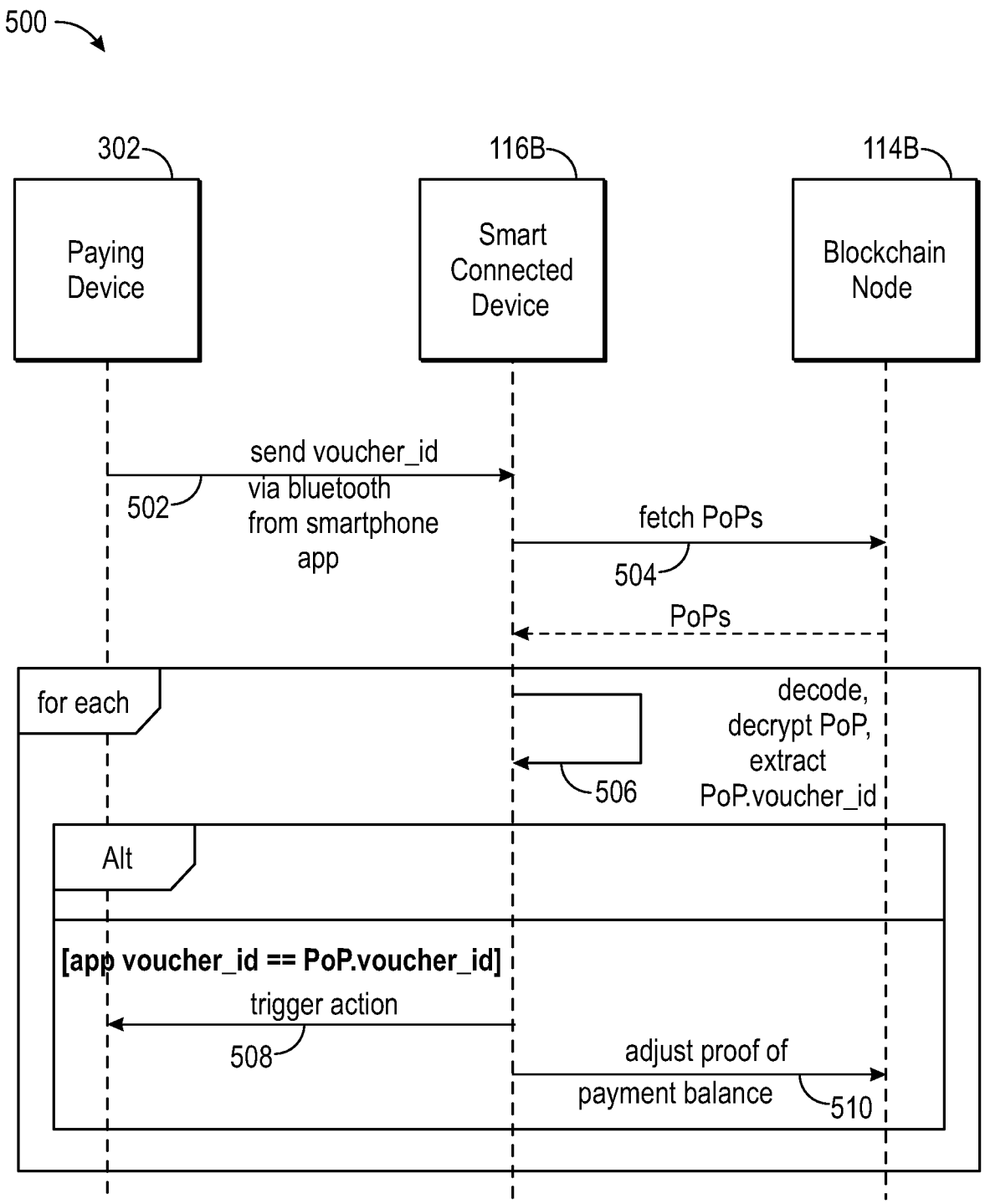
FIG. 5 illustrates an exemplary process for confirming proof of payment and/or adjusting a balance on a blockchain in response to a payment voucher, in accordance with various embodiments.

With reference to FIG. 5, a buyer may provide a proximity trigger using a wireless communication channel (e.g., Bluetooth, near field communication (NFC), an 802.11 wireless standard) for communication between native mobile app running on a payment device 302 and connected smart device 116B. The application may transmit a voucher id to smart connected device 116B for use in identifying the correct PoP payload from a list of PoP payloads retrievable from blockchain 109 (Step 502). Smart connected device 116B may invoke a smart contract to fetch all PoP payloads associated with the merchant from its blockchain node 114B by passing the merchant public key (used as a blockchain address) to the smart contract (Step 504). As the device belongs to the merchant, the device may have both the merchant's public key and private key available. The smart contract may return the PoP payloads associated with the merchant public key. The smart connected device 116B may also decode and/or decrypt the PoP payloads to access the data retained within the PoP payloads (Step 506).

In various embodiments, smart connected device 116B may iterate through the list of PoP payloads and identify the desired PoP payload by the voucher id received from the payment device 302 to the voucher id embedded in the PoP payloads. In response to a match being found, smart connected device 116B may trigger an action (Step 508). For example, an electromechanical actuator or a solenoid door lock may be triggered to move in response to the identifying the correct PoP payload. Smart connected device 116A may adjust the PoP payload balance and/or mark the PoP payload as redeemed by writing a new entry to the blockchain using a process similar to process 300 (Step 510).

Using the systems and methods described herein, the proof-of-payment process for payees may be near-instant. For example, a buyer might identify a rental house on a web site, pay via the web site, and have the house unlocked automatically upon receiving the PoP in a matter of seconds. The solution may be easily integrated into ecommerce platforms or other points of sale by forwarding payment details from a payment authorization entity to the PoP provider.

In various embodiments, the system and method may include alerting a subscriber when their computer is offline. The system may include generating customized information and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information;

generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is redirected to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

The computer system also includes a main memory, such as for example random access memory (RAM), and may include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

The computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include web servers (e.g. APACHE, IIS, GWS, SUN JAVA® SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MAC-BOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server such as a digital wallet hub. For example, a web client may access the services of an application server through another server and/or hardware component, which may have a direct or indirect connection to an Internet server. For example, a web client may communicate with an application server via a load balancer. In various embodiments, access is through a network or the Internet through a commercially available web-browser software package.

As those skilled in the art will appreciate, a web client includes an operating system (e.g., WINDOWS®/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, applications, and/or engines of PoP system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules, which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system, which monitors various hardware components and then communicates a detected input from the hardware to the micro-app.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Any databases discussed herein may include relational, hierarchical, graphical, or object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database-tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked based on the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE®ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.192.234). The web server retrieves the appropriate web pages and sends the data or applications for the web pages to the IP address. Web services are applications that are capable of interacting with other applications over a communications means, such as the interne. Web services are typically based on standards or protocols such as XML, SOAP, AJAX, WSDL and UDDI. Web services methods are well known in the art, and are covered in many standard texts. See, e.g., Alex Nghiem, IT Web Services: A Roadmap for the Enterprise (2003), hereby incorporated by reference.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

The merchant computer and the bank computer may be interconnected via a second network, referred to as a payment network. The payment network, which may be part of certain transactions, represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet®, Veriphone®, Discover Card®, PayPal®, ApplePay®, GooglePay®, private networks (e.g., department store networks), and/or any other payment networks.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means, which implement the function, specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may refer to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

Phrases and terms similar to "transaction account" may include any account that may be used to facilitate a financial transaction. Phrases and terms similar to "financial institution" or "account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:

registering, by a system that comprises at least one computing device, a smart lock of a merchant with a merchant account, the at least one computing device maintaining a blockchain node of a distributed database of blockchain nodes associated with a blockchain, the smart lock comprising a door lock that controls access to an area;

receiving, by the at least one computing device, a payment confirmation that includes a merchant identifier associated with the merchant account;

retrieving, by the at least one computing device, a record from a registration repository by matching the merchant identifier to the record, wherein the record comprises a merchant public key associated with the merchant identifier;

generating, by the at least one computing device, a proof-of-payment (PoP) payload comprising a payment amount;

encrypting, by the at least one computing device the PoP payload using the merchant public key to create an encrypted PoP payload;

writing, by the at least one computing device, the encrypted PoP payload to the blockchain node maintained by the at least one computing device;

receiving, by the smart lock, a voucher identifier from a payment device presented to the smart lock;

invoking, by the smart lock, a smart contract using the merchant public key to obtain a plurality of encrypted PoP payloads from a merchant blockchain node of the distributed database for the blockchain;

receiving, by the smart lock, the plurality of encrypted PoP payloads;

decrypting, by the smart lock, the plurality of encrypted PoP payloads; and unlocking, by the smart lock, the door lock based at least in part on matching the voucher identifier received from the payment device to a respective voucher identifier from one of the plurality of decrypted PoP payloads.

2. The method of claim 1, wherein invoking the smart contract comprises using the merchant identifier.

3. The method of claim 1, wherein the voucher identifier is received from the payment device via a wireless communication channel.

4. The method of claim 1, further comprising: adjusting, by the at least one computing device, a PoP payload balance in response to unlocking the door lock.

5. The method of claim 1, wherein unlocking the door lock comprises actuating at least one of an electromechanical actuator or a solenoid.

6. A system, comprising:

a smart lock of a merchant, and a proof of payment (PoP) network;

the PoP network comprises a computing device that maintains a blockchain node of a distributed database of blockchain nodes associated with a blockchain, the computing device comprises a first processor and a first memory; and a first set of machine-readable instructions stored in the first memory that, when executed by the first processor, cause the computing device to perform operations comprising:

registering the smart lock with a merchant account;

receiving a payment confirmation that includes a merchant identifier associated with the merchant account;

retrieving a record from a registration repository by matching the merchant identifier to the record, wherein the record comprises a merchant public key associated with the merchant identifier;

generating a PoP payload comprising a payment amount;

encrypting the PoP payload using the merchant public key to create an encrypted PoP payload;

writing the encrypted PoP payload to the blockchain node maintained by the computing device;

the smart lock comprises a door lock, a second processor and a second memory; and a second set of machine-readable instructions stored in the second memory that, when executed by the second processor, cause the smart lock to perform operations comprising:

receiving a voucher identifier from a payment device presented to the smart lock;

invoking a smart contract using the merchant public key to obtain a plurality of encrypted PoP payloads from a merchant blockchain node of the distributed database for the blockchain;

receiving the plurality of encrypted Pop payloads;

decrypting the plurality of PoP payloads; and unlocking the door lock based at least in part on matching the voucher identifier to a respective voucher identifier from one of the plurality of decrypted PoP payloads.

7. The system of claim 6, wherein the second set of machine-readable instructions stored in the second memory that, when executed by the second processor, cause, the smart lock to perform operations comprising:

identifying a proximity trigger provided by the payment device using a wireless communication channel.

8. The system of claim 6, wherein invoking the smart contract comprises using the merchant identifier.

9. The system of claim 6, wherein the voucher identifier is received from the payment device via a wireless communication channel.

10. The system of claim 6, wherein unlocking the door lock further causes the smart lock to perform operations comprising adjusting a PoP payload balance.

11. The system of claim 6, wherein unlocking the door lock comprises actuating at least one of an electromechanical actuator or a solenoid.

12. The method of claim 1, wherein the payment amount is extracted from an authorization request associated with the payment confirmation, the authorization request being included in the record obtained from the registration repository.

13. The method of claim 1, further comprising extracting, by the at least one computing, the merchant identifier from the payment confirmation.

14. The system of claim 6, wherein the payment amount is extracted from an authorization request associated with the payment confirmation, the authorization request being included in the record obtained from the registration repository.

15. The system of claim 6, wherein the first set of machine-readable instructions, when executed by the first processor, further cause the computing device to perform operations comprising: extracting the merchant identifier from the payment confirmation.

16. A system comprising:

a first non-transitory computer-readable medium comprising a first set of instructions executable in at least one computing device, wherein, when executed by a first processor, the first set of instructions cause the at least one computing device to perform operations comprising:
- registering a smart lock of a merchant with a merchant account, the smart lock comprising a door lock and that controls access to an area;
- receiving a payment confirmation that includes a merchant identifier associated with the merchant account;
- retrieving a record from a registration repository by matching the merchant identifier to the record, wherein the record comprises a merchant public key associated with the merchant identifier;
- generating a proof-of-payment (PoP) payload comprising a payment amount;
- encrypting the PoP payload using the merchant public key to create an encrypted PoP payload;
- writing the encrypted PoP payload to a blockchain node of a distributed database of blockchain nodes for a blockchain, the at least one computing device maintaining the blockchain node;

the smart lock comprising a second processor and a second memory; and a second non-transitory computer-readable medium comprising a second set of instructions executable the smart lock, wherein, when executed by the second processor, the second set of instructions cause the smart lock to perform operations comprising:
- receiving, by the smart lock, a voucher identifier from a payment device presented to the smart lock;
- invoking, by the smart lock, a smart contract using the merchant public key to obtain a plurality of encrypted PoP payloads from a merchant blockchain node of the distributed database for the blockchain;
- receiving, by the smart lock, the plurality of encrypted Pop payloads;
- decrypting, by the smart lock, the plurality of encrypted PoP payloads; and
- unlocking, by the smart lock, the door lock based at least in part on matching the voucher identifier to a respective voucher identifier from one of the plurality of PoP payloads.

17. The system of claim 16, wherein the payment amount is extracted from an authorization request associated with the payment confirmation, the authorization request being included in the record obtained from the registration repository.

18. The system of claim 16, wherein the voucher identifier is received from the payment device via a wireless communication channel.

19. The system of claim 6, further comprising a magnetic stripe reader, and wherein the second set of machine-readable instructions, when executed by the second processor, causes the smart lock to perform operations comprising:
- determining the payment account of the payment device based at least in part on the magnetic stripe reader reading the payment device, wherein the magnetic stripe reader is in electronic communication with the smart lock.

20. The method of claim 1, further comprising: identifying, by the at least one computing device, a proximity trigger provided by the payment device using a wireless communication channel.

* * * * *